US009469491B2

(12) United States Patent
Kaljunen et al.

(10) Patent No.: US 9,469,491 B2
(45) Date of Patent: Oct. 18, 2016

(54) ROTARY FEEDER

(71) Applicant: ANDRITZ OY, Helsinki (FI)

(72) Inventors: Markku Kaljunen, Lahti (FI); Pekka Kokko, Hollola (FI)

(73) Assignee: Andritz Oy, Helsinki (FI)

( * ) Notice: Subject to any disclaimer, the term of this patent is extended or adjusted under 35 U.S.C. 154(b) by 111 days.

(21) Appl. No.: 14/411,352

(22) PCT Filed: Jun. 24, 2013

(86) PCT No.: PCT/FI2013/050690
§ 371 (c)(1),
(2) Date: Dec. 24, 2014

(87) PCT Pub. No.: WO2014/001630
PCT Pub. Date: Jan. 3, 2014

(65) Prior Publication Data
US 2015/0191317 A1    Jul. 9, 2015

(30) Foreign Application Priority Data

Jun. 25, 2012  (FI) ..................................... 20125706

(51) Int. Cl.
*B65G 65/48*    (2006.01)
(52) U.S. Cl.
CPC .................................. *B65G 65/4881* (2013.01)
(58) Field of Classification Search
CPC ............. B65G 65/4481; B05L 11/005; Y10T 83/0467; Y10T 83/2074; Y10T 83/2083; Y10T 83/2087; Y10T 83/2092; Y10T 83/2096; Y10T 83/21; Y10T 83/2103; Y10T 83/2105; Y10T 83/2107; Y10T 83/2109; Y10T 83/2111
USPC ................................................... 222/345, 386
See application file for complete search history.

(56) References Cited

U.S. PATENT DOCUMENTS

| 3,052,383 | A | 9/1962 | Transeau |
| 5,114,053 | A | 5/1992 | Beirle |

FOREIGN PATENT DOCUMENTS

| DE | 43 02 962 A1 | 8/1994 |
| DE | 198 03 688 A1 | 8/1999 |
| JP | 2-127320 | 5/1990 |

OTHER PUBLICATIONS

International Search Report issued in 050690 mailed Nov. 6, 2013.

*Primary Examiner* — Patrick M Buechner
*Assistant Examiner* — Jeremy W Carroll
(74) *Attorney, Agent, or Firm* — Nixon & Vanderhye P.C.

(57) ABSTRACT

A rotary feeder for transferring loose material, said rotary feeder having a housing, where a rotor transfers material from the feed channel of the housing into the discharge channel of the housing, the rotor having blades for transferring the material, and a counter blade is fixed in the housing of the rotary feeder between the blades of the rotor for cutting oversized pieces of material. A filler is arranged in the feed channel of the rotary feeder, to prevent the formation of a protrusion in the feed channel that would disturb the flow of the material formed by the counter blade, the edge of the filler adjacent to the counter blade being arranged to yield, and the filler is arranged to return to its initial position after the cutting operation.

10 Claims, 2 Drawing Sheets

ROTARY FEEDER

RELATED APPLICATIONS

Figure 1:
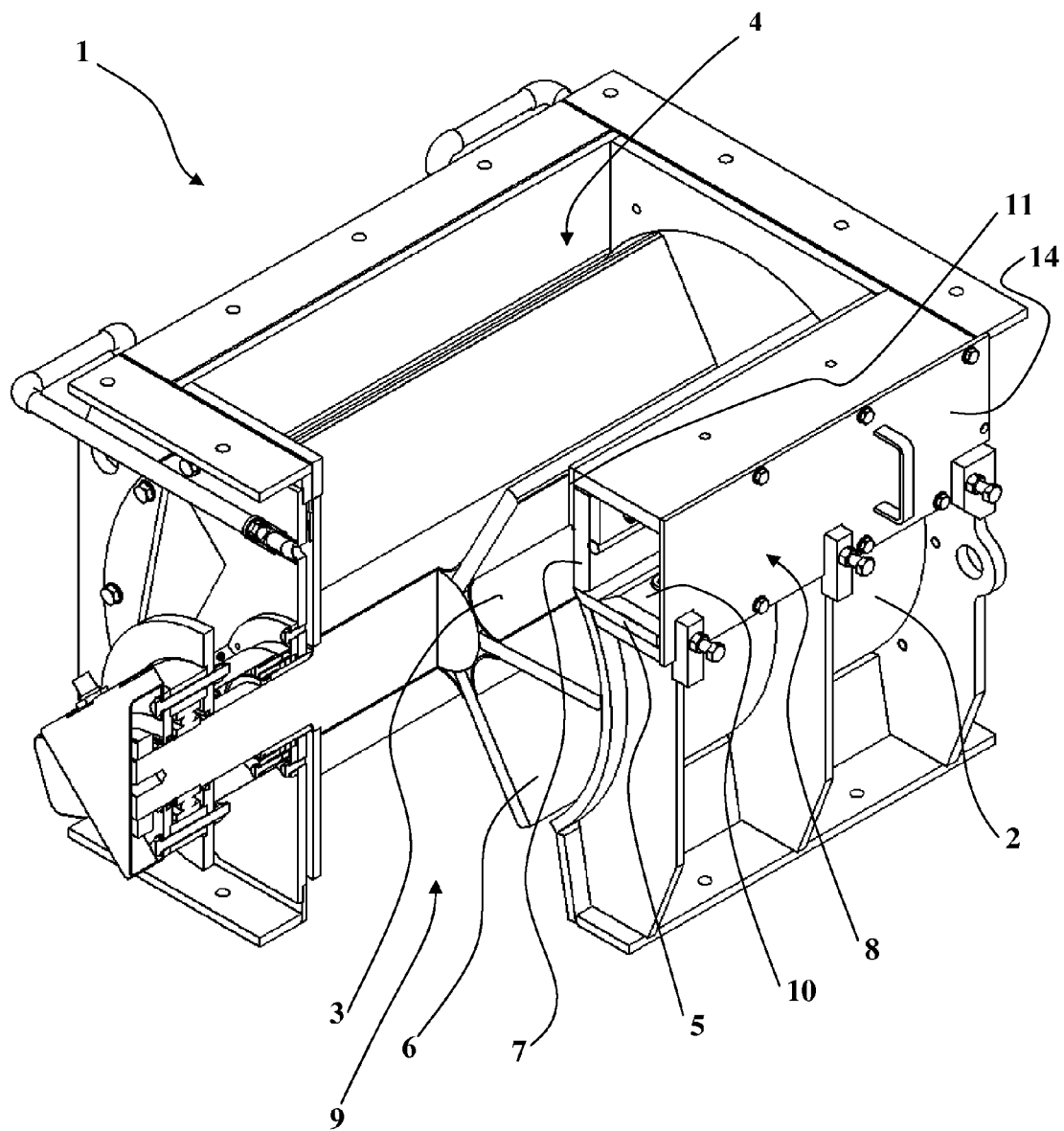

This application is the U.S. national phase of International Application No. PCT/FI2013/050690 filed 24 Jun. 2013 which designated the U.S. and claims priority to FI 20125706 filed 25 Jun. 2012, the entire contents of each of which applications are hereby incorporated by reference.

OBJECT OF THE INVENTION

The present invention relates to a rotary feeder for transferring loose material from one space to another, said rotary feeder having a housing provided with a journaled rotor, which rotor transfers material from the feed channel of the housing into the discharge channel thereof, said rotor being provided with blades or cavities for transferring the material, and a counter blade is attached in the housing at the final end of the feed channel for cutting oversized pieces of material that do not fit between the rotor blades or in the cavities when the gap between the rotor blade or the edge of the cavity and the counter blade is substantially closed.

PRIOR ART

Rotary feeders are used when feeding material from one space to another, e.g. from an atmospheric space into a pressurized and/or hot space. Overpressure and heat are prevented from escaping through the feed opening by feeding the material with a rotary feeder typically having a rotating rotor with blades or cavities and a housing, wherein the rotor rotates. The structure of the rotor and the housing is such that free escaping of heat and/or pressure via the feed channel is prevented.

For instance biomass has oversized or overlong pieces that do not fit in the cavity of the rotary feeder or in the space between the blades when the rotor rotates into the feed direction. Therefore it is inevitable to construct the rotor of the rotary feeder and the housing surrounding it so strong that oversized pieces are cut while passing between the rotor blade or the cavity edge and the frame of the rotary feeder. For assisting the cutting, a counter blade is typically arranged at the edge of the final end of the feed channel. The counter blade can simply be a blunt edge of the housing, whereby the cutting forces are very high and the rotating of the rotor consumes a lot of energy and the blades of the rotor are subjected to high forces. These forces can even cause breaking of the blades.

A sharp counter blade penetrates best into a piece to be cut and the sharing forces are remarkably smaller than those of a blunt counter blade. Using a sharp counter blade usually requires tapering of the feed opening in the area of the counter blade, whereby the counter blade form a protrusion, upon which long pieces may be supported and they do not pass into cutting. This leads to clogging of the feed channel. An example of the formation of a protrusion of an emphasized size on a counter blade is in FIG. 1 of publication U.S. Pat. No. 3,052,383 and an example of the formation of a small protrusion still hampering the flow of material is in FIG. 3 of publication JP2127320.

Attempts have been made to solve the clogging problem by construing the feed channel above the counter blade slanted, whereby no protrusion is formed. On the other hand, this kind of tapering of the feed channel also easily results in clogging of the feed channel, especially by oversized material, when the material stream packs in the tapering channel. An example of a slanted channel above a counter blade is in publication U.S. Pat. No. 5,114,053.

In prior art apparatuses, the counter blade has to be replaced via the feed channel, which may be very complicated, because the channel has to be emptied for that purpose. In the solution according to publication U.S. Pat. No. 5,114,053 the replacement of the counter blade is especially troublesome.

THE PURPOSE AND SOLUTION OF THE INVENTION

A novel solution has been developed for cutting material that does not fit in the space between the rotor blades or cavities of a rotary feeder while the material is transferred from a feed channel into a discharge channel. The purpose of the invention is to ensure continuous operation of the rotary feeder and provide the widest and most versatile solution possible for the limiting problems. This purpose is achieved by accomplishing the apparatus of the preamble of the independent claim as is presented in the characterizing part of said claim. Preferred embodiments of the invention may correspond to the dependent claims.

In accordance with the present invention, sticking of material being fed to a rotary feeder to a protrusion, a sill or a step formed by a counter blade in the feed channel is prevented by covering or filling a space in the feed channel adjacent to the counter blade with a filler that yields during the cutting event.

The filler is arranged adjacent to the counter blade in the feed channel so that the filler or at least the edge thereof adjacent to the counter blade can yield to give way to the cutting procedure while the counter blade is cutting a piece being fed. Due to this yielding and reversing, the counter blade can penetrate deep into the piece being cut and thus the required cutting force remains as small as possible. After the cutting procedure, the filler returns to its place and pushes and frees pieces stagnated on the counter blade into the feed channel and therefore the flow of pieces is not substantially disturbed or clogged. The edge of the filler closest to the counter blade can preferably be located essentially outer than the counter blade in the flow opening of the rotary feeder. This arrangement will ensure that no protrusion is formed that might cause the material flow to stop, e.g. due to wearing of the filler or pressure caused by the material flow.

The filler may have a solid form, such as a suspended metal plate or other inflexible filler. A filler that is planar or otherwise has a solid form can yield e.g. so that its upper edge is hinged in the feed channel. It can also move linearly e.g. on guide bars. The withdrawal and reverse motions of a filler of solid form is made possible by means of flexible elements located behind the filler, such as springs and e.g. hinges, guides or other surfaces controlling the motion. Yielding outwards can be limited by means of stoppers that control the mutual distance between the filler and the counter blade in the direction of the resilient motion. These stoppers can be put or formed e.g. in the feed channel, the guide bars or flexible elements.

A resilient filler may be made of e.g. rubber or other adequately elastic and reversible material, whereby it does not necessarily need other components in order to function. There might be an open space behind the resilient filler, in which it can yield to. Resilient filler may be placed on a solid wall, in which case the yielding is based only to the elasticity of the material. Even a metal plate that is properly dimensioned, attached and tolerant to deformations can act as resilient filler, if it has free space behind it.

When the filler material is rubber or other corresponding elastic material, it does not necessarily need hinging. The reverse motion of the filler may additionally be assisted e.g. by means of springs. Then e.g. wearing and deformation of the filler can be compensated better. Outwardly resilience of the flexible filler can also be limited by means of stoppers. A resilient filler material allows the counter blade to form a protrusion that projects into the channel only momentarily at and in the vicinity of the piece to be cut. The rest of the feed channel remains unobstructed.

Arranging the filler in the feed channel above the counter blade is most advantageous in view of both the implementation and the material flow, when the edge of the feed channel on the side of the counter blade is straight and its cross section does not substantially change, at least does not reduce. A resilient filler material most easily facilitates the utilization of the solution according to the invention in connection with feed channels or counter blades having another form. Further, a resilient filler material may provide the easiest way to accomplish a solution where the blade is not parallel to the rotor axis or the rotor blades, due to e.g. limiting the force required for cutting.

The filler may be continuous or it may be comprised of e.g. a component that at the tip of the V-shaped counter blade is divided in the longitudinal direction into two or more independently moving parts. Dividing a solid-formed filler also makes it possible that in conjunction with the cutting event, the counter blade does not emerge in its whole length.

Behind the filler in the housing of the rotary feeder, a space and a hatch can be arranged, via which the counter blade can be detached, fixed, checked and/or replaced from outside of the apparatus. Thus, maintenance operations can be performed flexibly and quickly.

Advantages of the invention include e.g. the following:
The counter blade can be detached and replaced without substantially disassembling the apparatus,
the feed channel can be kept irreducible and unobstructed,
cloggings are avoided and the material stream moves as continuously as possible,
the counter blade can be shaped, located and positioned for good cutting performance independent of a need to avoid clogging and
the cutting forces can be kept the smallest possible, which reduces energy consumption and wearing and damaging of the structures.

LIST OF DRAWINGS

Figure 2:
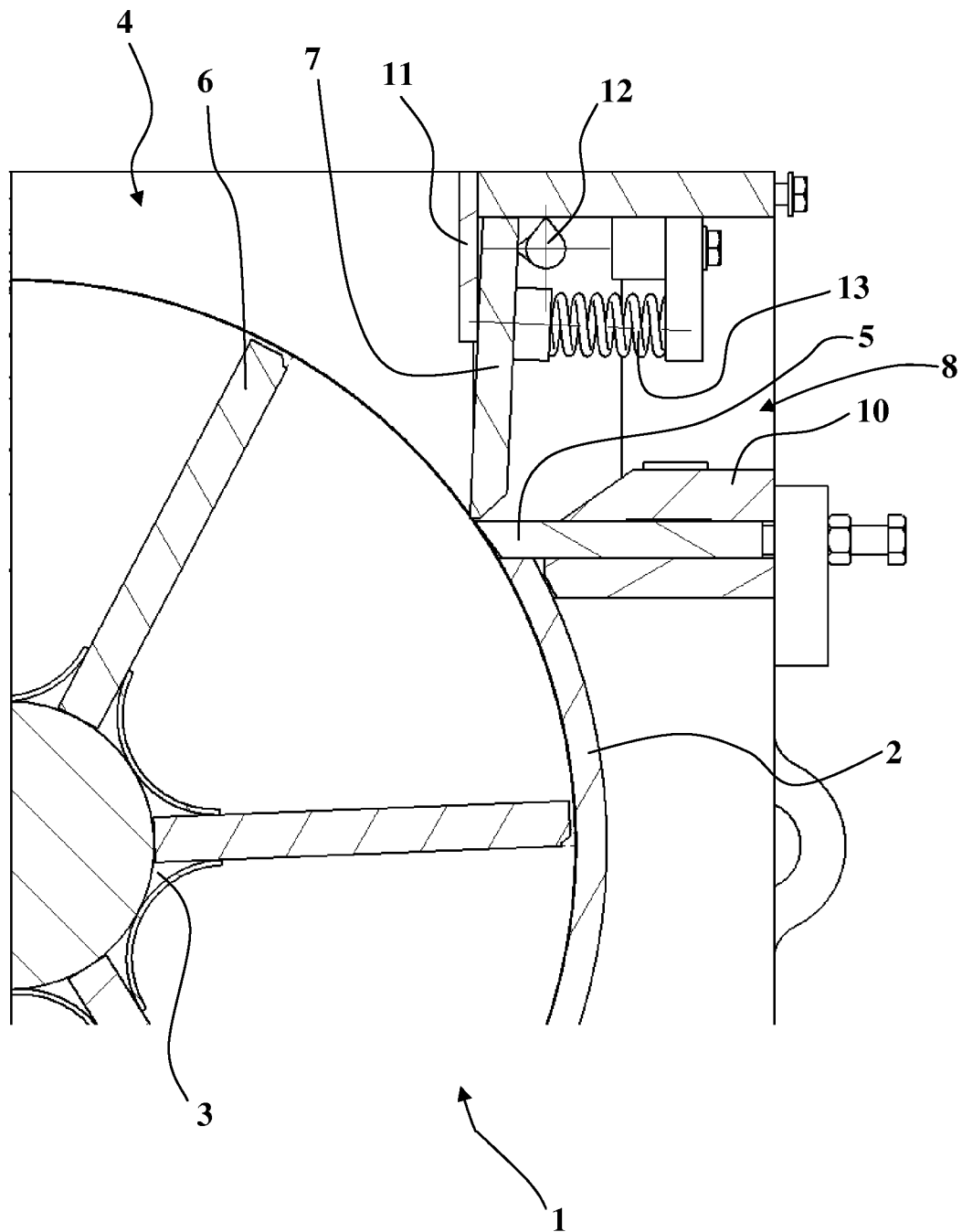

In the following, the invention is disclosed in more detail with reference to the appended drawings, of which FIG. 1 illustrates an embodiment of the invention using a resilient filler material and FIG. 2 illustrates a second embodiment of the invention using a solid-formed filler material.

DETAILED DESCRIPTION OF THE INVENTION

FIG. 1 illustrates as a partial cross cut a rotary feeder 1 which is implemented by a resilient filler material. The rotary feeder 1 has a housing 2, inside which rotates a rotor 3 that is supported on bearings in the housing at its ends and rotated by a drive (not shown). The housing 2 comprises a final end of the feed channel 4, wherein a counter blade 5 is arranged that cuts oversized pieces present in the material stream being fed. The counter blade 5 is kept in place by a blade holder 10 fixed thereupon. The counter blade 5 is arranged with respect to the edges of the blades 6 of the rotor 3 or the cavities in the rotor so that a cutting pair of blades is formed. Above the counter blade 5 in the feed channel a filler 7 made of a flexible material, such as rubber, is fixed under the support plate 11, which filler withdraws under the force of the piece being cut and reverses after the cutting to cover the counter blade 5 so that it does not extend into the feed channel 4. The material stream exits the apparatus via a discharge channel 9.

The filler 7 may be positioned in the final end of the feed channel on the same level as the tip of the counter blade 5. Preferably it extends substantially outer than the counter blade 5 into the feed channel 4. Then the forces caused by the material stream or the wearing of the filler 7 do not so easily leave the counter blade 5 open and thus cause the protrusion formed by the counter blade to be exposed to the feed channel 4 in other situations than the cutting event. To ensure that the counter blade 5 is exposed only in connection with the actual cutting event, the forces that cause the filler 7 to reverse are to be of adequate strength.

The resilient filler 7 may be mounted so that there is no empty space behind it. Then the filler 7 has to be of adequate thickness and the material has to be elastic enough to make adequate yielding possible.

FIG. 2 illustrates a detail of an arrangement according to the invention, where the filler 7 is a metal plate or another solid-formed piece. The filler is hinged with hinges 12 at its upper edge to the feed channel 4 or the housing 2 and behind it resilient elements 13 such as springs are arranged, which return the filler 7 to its basic position. A support plate 11 acts as a stopper that defines the basic position of the filler 7. The filler 7 can be divided in its longitudinal direction into two or more parts that will yield and reverse independently.

The counter blade 5 can be detached, checked, fixed and/or replaced via a hatch 8. Preferably the hatch is covered by a lid 14. Preferably the resilient elements 13 supporting the filler 7 are arranged so that there is no need to detach them when replacing the counter blade 5.

Although the above description relates to embodiments of the invention that in the light of present knowledge are considered the most preferable, it is obvious to a person skilled in the art that the invention can be modified in many different ways within the broadest possible scope defined by the appended claims alone.

The invention claimed is:

1. A rotary feeder for transferring loose material from one space to another, said rotary feeder including:
a housing containing a rotor rotatably mounted in the housing, wherein the rotor transfers material from a feed channel of the housing into a discharge channel of the housing, said rotor having blades or cavities for transferring the material, and a counter blade is fixed in the housing of the rotary feeder in a final end of the feed channel and between the blades of the rotor or in the cavities for cutting oversized pieces of material as a gap between the blade of the rotor or an edge of the cavity and the counter blade is substantially closed, wherein a filler is arranged in the feed channel adjacent to the counter blade, which filler prevents formation of a protrusion formed by the counter blade in the feed channel, which protrusion would hamper the flow of the material, the edge of the filler adjacent to the counter blade is arranged to yield when the counter blade cuts oversized pieces and the filler is arranged to reverse after the cutting event to its initial position.

2. The rotary feeder of the claim 1, wherein the filler is made of a resilient material.

3. The rotary feeder according to claim 1, wherein the filler is returned to its initial position by means of flexible elements.

4. The rotary feeder according to claim 1, further comprising a hatch on the housing.

5. The rotary feeder according to claim 1, wherein the filler is arranged in the feed channel so that the edge of the filler adjacent to the counter blade when unloaded extends substantially further into the feed channel than the counter blade.

6. The rotary feeder according to claim 1, wherein the filler is divided along a longitudinal direction into two or more parts that yield and reverse independently.

7. A rotary feeder comprising:
- a rotor having a rotational axis and including an annular array of blades extending radially outward to a circumference of the rotor and an annular array of cavities, wherein each of the cavities are formed by an adjacent pair of the blades,
- a semi-cylindrical housing including an opening to a feed channel configured to pass feed material to the rotor and an opening to discharge channel configured to pass feed material from the rotor, wherein the rotor is within the semi-cylindrical housing;
- a counter blade fixed to the housing and having a leading edge adjacent both the circumference of the rotor and the opening to the feed channel, wherein the leading edge is parallel to the rotational axis, and
- a resilient filler element attached to the housing and having an edge adjacent and parallel to the leading edge of the counter blade, wherein the resilient filler element forms a portion the feed channel and the filler element, wherein the edge of the resilient filler element is configured to deflect as pieces in the filler material are cut as a blade of the rotor passes the leading edge of the counter blade.

8. The rotary feeder of claim 7 wherein the edge of the resilient filler element is formed of a deformable elastic material.

9. The rotary feeder of claim 7 wherein the resilient filler member is attached by a hinge to the housing and the resilient member is biased to align the edge of the resilient filler element with the leading edge of the counter blade.

10. The rotary feeder of claim 9 wherein the resilient filler member is biased by a spring between the resilient filler member and the stationary support attached to the housing.

* * * * *